United States Patent
Flynn et al.

(10) Patent No.: US 10,185,844 B2
(45) Date of Patent: Jan. 22, 2019

(54) SECURITY DEVICE FOR DATA COMPONENT

(71) Applicant: Hewlett-Packard Development Company, L.P., Houston, TX (US)

(72) Inventors: Tom Flynn, Magnolia, TX (US); Christoph Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/521,777

(22) PCT Filed: Jan. 19, 2015

(86) PCT No.: PCT/US2015/011913
§ 371 (c)(1),
(2) Date: Apr. 25, 2017

(87) PCT Pub. No.: WO2016/118106
PCT Pub. Date: Jul. 28, 2016

(65) Prior Publication Data
US 2017/0249484 A1    Aug. 31, 2017

(51) Int. Cl.
*G06F 21/85*    (2013.01)
*G06F 21/86*    (2013.01)
(Continued)

(52) U.S. Cl.
CPC .............. *G06F 21/85* (2013.01); *G06F 21/86* (2013.01); *H01R 13/443* (2013.01);
(Continued)

(58) Field of Classification Search
CPC .. H01R 13/60; H01R 13/443; H01R 13/5213; H01R 13/6271; H01R 24/60; H01R 2107/00; G06F 21/85; G06F 21/86
(Continued)

(56) References Cited

U.S. PATENT DOCUMENTS 4,163,594 A * 8/1979 Aujla ................. H01R 13/6397
439/133
5,026,295 A * 6/1991 Fong .................. H01R 13/5213
439/135
(Continued)

FOREIGN PATENT DOCUMENTS

JP         3135047 U      8/2007
TW       200622721 A      7/2006
WO    WO-2014140559 A    9/2014

OTHER PUBLICATIONS

USB 2.0 Connector with USB Type a Female, Dip for Right Angle Flank Type, 2015, pp. 1-3, Attend Technology Inc.

*Primary Examiner* — Tulsidas C Patel
*Assistant Examiner* — Travis Chambers
(74) *Attorney, Agent, or Firm* — Tarolli Sundheim Covell & Tummino (57) ABSTRACT

A security device for preventing the use of a data sending/receiving component having a connector and positioned in a computer housing includes a locking member. The locking member has a sidewall defining an interior space. A plurality of tabs extends from the sidewall towards an end of the locking member. The tabs are deflectable relative to the sidewall. The tabs of the locking member have a deflected condition in which the tabs extend a first angle from the sidewall to allow for movement of the locking member into the data sending/receiving component in a first direction and an installed condition in which the tabs extend a second angle greater than the first angle to prevent removal of the locking member from the data sending/receiving component. The locking member is incapable of returning to the deflected condition once in the installed condition by accessing the end of the locking member.

16 Claims, 9 Drawing Sheets

(51) Int. Cl.
*H01R 13/443* (2006.01)
*H01R 13/627* (2006.01)
*H01R 24/60* (2011.01)
*H01R 107/00* (2006.01)

(52) U.S. Cl.
CPC ......... *H01R 13/6271* (2013.01); *H01R 24/60* (2013.01); *H01R 2107/00* (2013.01)

(58) Field of Classification Search
USPC .................... 439/133, 134, 135, 892, 893
See application file for complete search history.

(56) References Cited

U.S. PATENT DOCUMENTS

| | | | | |
|---|---|---|---|---|
| 6,309,247 | B1 * | 10/2001 | Wang | H01R 13/5213 439/135 |
| 7,094,099 | B2 * | 8/2006 | Daggett | H01R 13/6273 439/544 |
| 7,128,586 | B2 * | 10/2006 | Kung | H01R 13/6275 439/133 |
| 7,285,004 | B1 | 10/2007 | Fukuda et al. | |
| 7,390,201 | B1 | 6/2008 | Quinby et al. | |
| 7,462,045 | B1 | 12/2008 | Lee | |
| 7,465,181 | B1 * | 12/2008 | Bridges | H01R 13/6271 439/133 |
| 7,479,021 | B2 * | 1/2009 | Huang | H01R 13/629 439/133 |
| 7,611,371 | B2 * | 11/2009 | Guo | H01R 13/447 439/367 |
| 7,635,272 | B2 * | 12/2009 | Poppe | H01R 13/6397 439/133 |
| 7,886,360 | B2 | 2/2011 | Schmitt | |
| 7,909,629 | B2 * | 3/2011 | Lev | H01R 13/4538 439/247 |
| 8,033,853 | B2 * | 10/2011 | Chang | H01R 13/6275 439/304 |
| 8,449,309 | B1 | 5/2013 | Mosholder | |
| 8,845,355 | B2 | 9/2014 | Litowitz et al. | |
| 9,391,403 | B2 * | 7/2016 | Ahn | G06F 21/85 |
| 9,608,375 | B2 * | 3/2017 | Ahn | G06F 21/85 |
| 2009/0042433 | A1 | 2/2009 | Bushby | |
| 2012/0289069 | A1 * | 11/2012 | Chueh | H01R 13/6397 439/135 |
| 2014/0130555 | A1 | 5/2014 | Clark | |

\* cited by examiner

SECURITY DEVICE FOR DATA COMPONENT

CROSS-REFERENCE TO RELATED APPLICATION

This application is a U.S. National Stage Application of and claims priority to International Patent Application No. PCT/US2015/011913, filed on Jan. 19, 2015, and entitled "SECURITY DEVICE FOR DATA COMPONENT."

BACKGROUND

Data breaches or infection of hardware are concerns for many computer users, such as businesses and educational settings. Computers can be hacked at the BIOS level and/or physically breached at the computer housing level. Accordingly, preventing access to computer interface ports is desirable, e.g., in an open or public setting such as an open office environment or a classroom.

DETAILED DESCRIPTION

This disclosure relates to a security device and, in particular, relates to a locking member for a data sending/receiving component to prevent use thereof. The data sending/receiving component can constitute any known physically interfaced computing device for sending and/or receiving electrical and/or data signals for transmitting the same between computing devices. Example data sending/receiving components include, but are not limited to, USB connection (e.g., Standard A USB, Standard B USB, Mini-USB, Micro-USB), HDMI connection or DisplayPort connection (e.g., Mini-DisplayPort) or a 1394 or Firewire connection. As shown and described, the data sending/receiving component is a standard USB connector or port.

FIGS. 1-4 illustrate an example locking member 20. The locking member 20 is configured to be installed within a USB port 120 or receptacle positioned with a computer housing or chassis 100 of a computer 98, which can constitute a desktop computer, laptop computer, server, etc. When installed, the locking member 20 acts as a security device to prevent access to the USB port 120 and can only be removed by opening or removing the computer housing 100. The locking member 20 is therefore not removable from the front of the computer housing.

Figure 1:
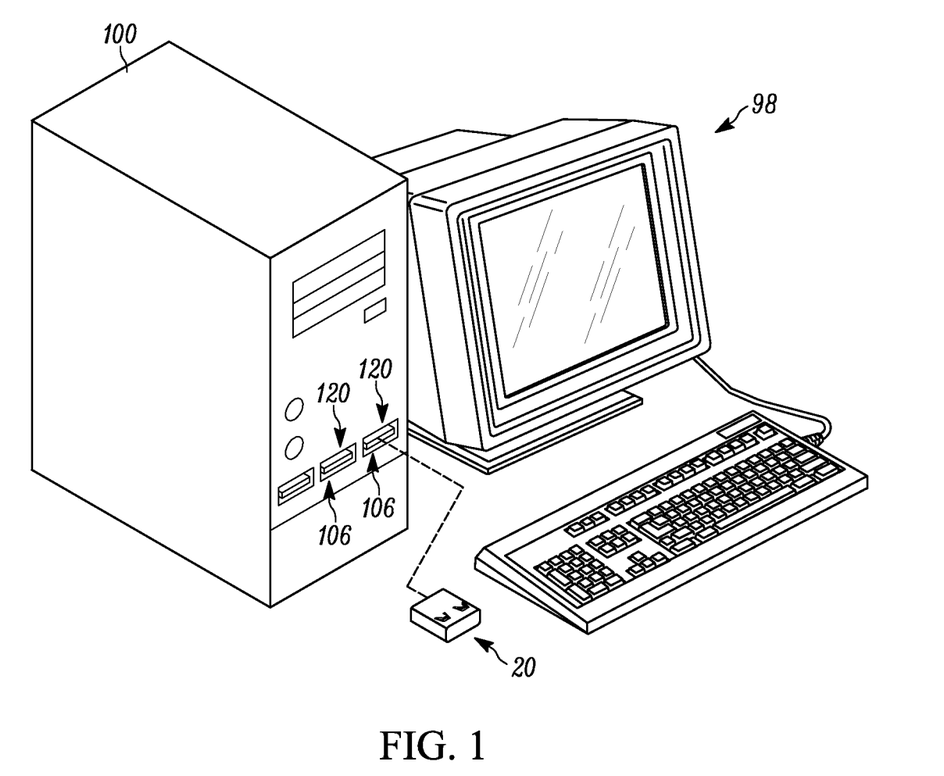
FIG. 1 is a schematic illustration of an example locking member for installation into a USB port.
Figure 2:
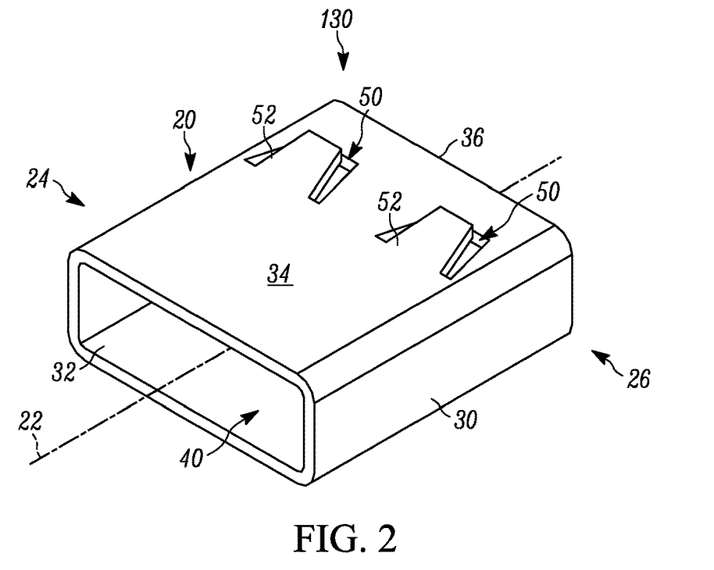
FIG. 2 is an isometric view of the locking member of FIG. 1.
Figure 3:
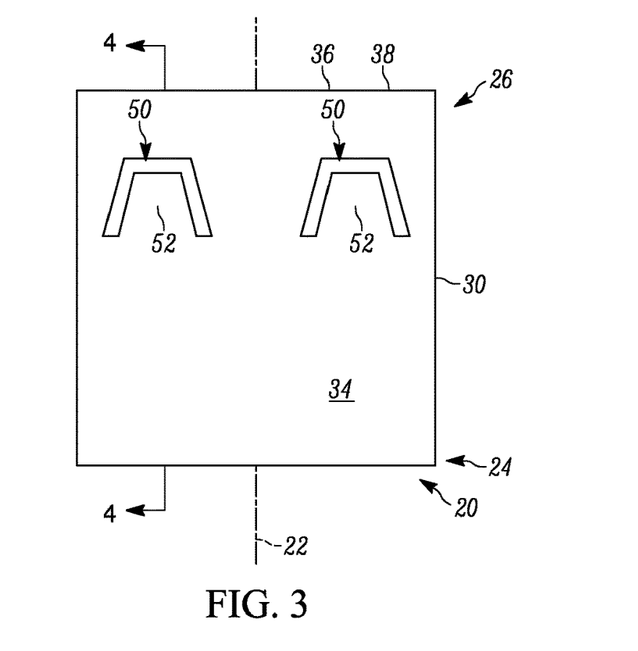
FIG. 3 is a top view of the locking member of FIG. 1
Figure 4:
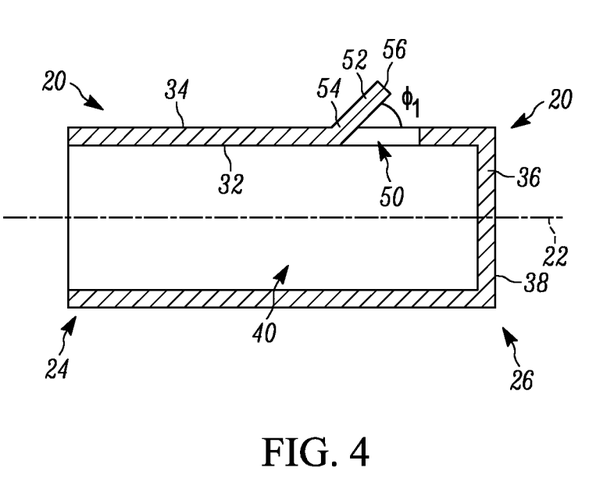
FIG. 4 is a section view taken along line 4-4 of FIG. 3.

Referring to FIGS. 2-4, the locking member 20 has a generally rectangular shape and extends along a centerline 22 from a first end 24 to a second end 26. The locking member 20 includes a sidewall 30 having an inner surface 32 and an outer surface 34. The inner and outer surfaces 32, 34 are concentric with one another. The sidewall 30 is rectangular but can alternatively be square or have another polygonal shape (not shown). The inner surface 32 defines an interior space 40 that is open or accessible at the first end 24 of the locking member 20 and closed or inaccessible by an end wall 36 at the second end 26. The end wall 36 extends perpendicular to the centerline 22 and is free of openings such that the interior space 40 is inaccessible from the second end 26 of the locking member 20. The end wall 36 includes an outer surface 38 facing away from the interior space 40.

One or more openings 50 extend through the sidewall 30 toward the second end 26 of the locking member 20 and from the outer surface 34 to the inner surface 32 to define one or more tabs 52. As shown, a pair of openings 50 on either side of the centerline 22 defines a pair of tabs 52. The openings 50 may be generally U-shaped to define, e.g., a pair of rounded tabs 52, although the openings are illustrated as generally trapezoidal in shape and can have alternative shapes, e.g., square, triangular or circular, to define alternatively shaped tabs. Each tab 52 has an end 54 (see FIG. 4) connected to the sidewall 30 and a free end 56 extending away from the sidewall at an angle $\Phi_1$ relative to the outer surface 34. The angle $\Phi_1$ can range from a few degrees to near 90°. As shown, the angle is approximately 45°. The tabs 52 have a resilient construction and are elastically deformable about the end 54. In particular, the free ends 56 are pivotable about the ends 54 through the opening 50 between an initial, unstressed condition shown in FIGS. 2-4 and a stressed condition in which the angle $\Phi_1$ is reduced. Alternatively (not shown), the tabs 52 can be separate components from the sidewall 50 but connected to and biased into an angled position relative to the sidewall by a spring or coiled member.

Figure 5:
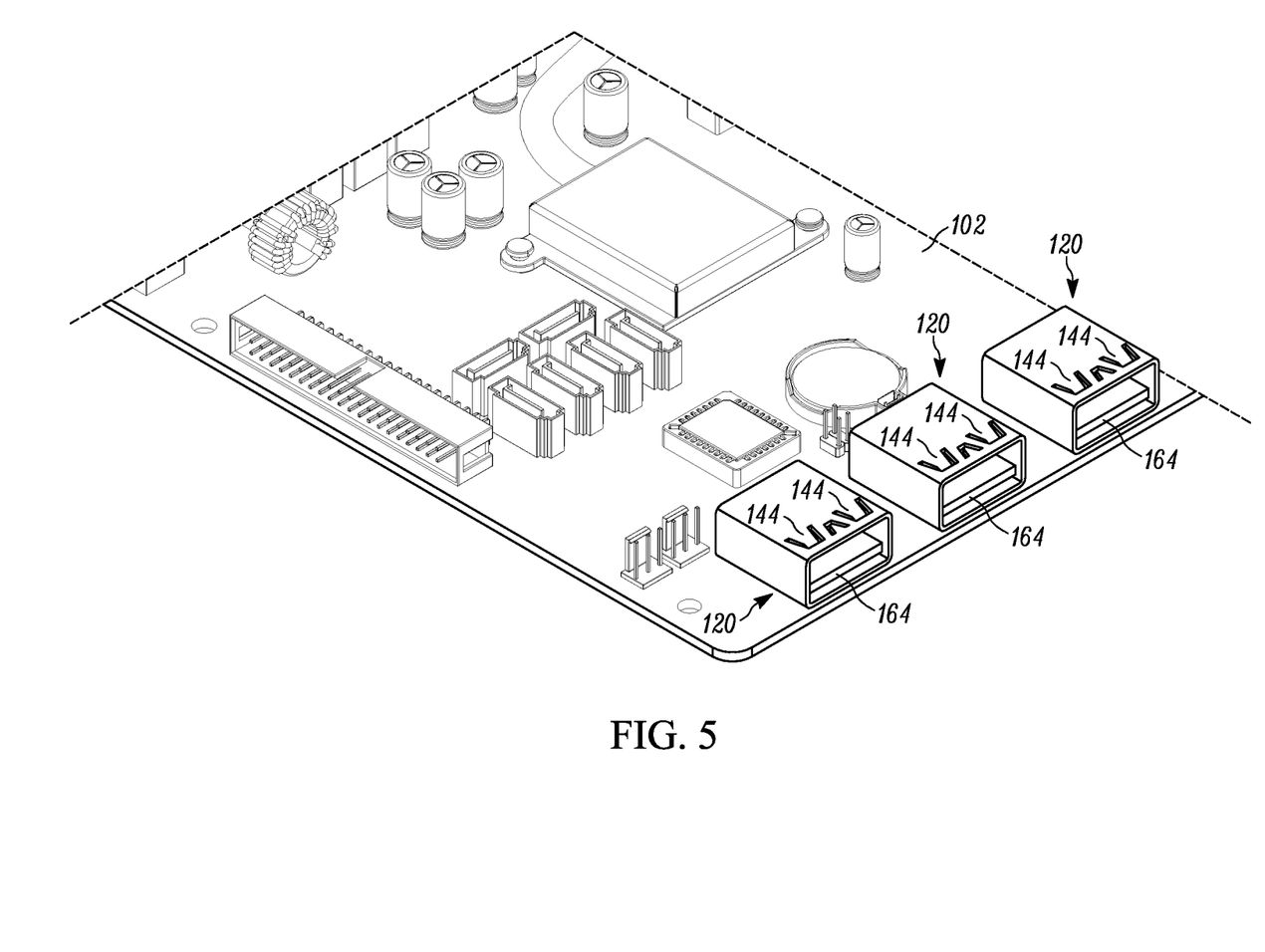
FIG. 5 is an isometric view of the USB port of FIG. 1.
Figure 6:
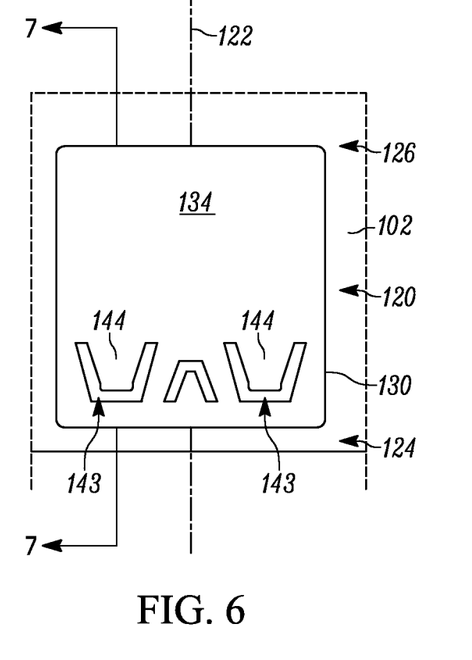
FIG. 6 is a top view of the USB port of FIG. 1
Figure 7:
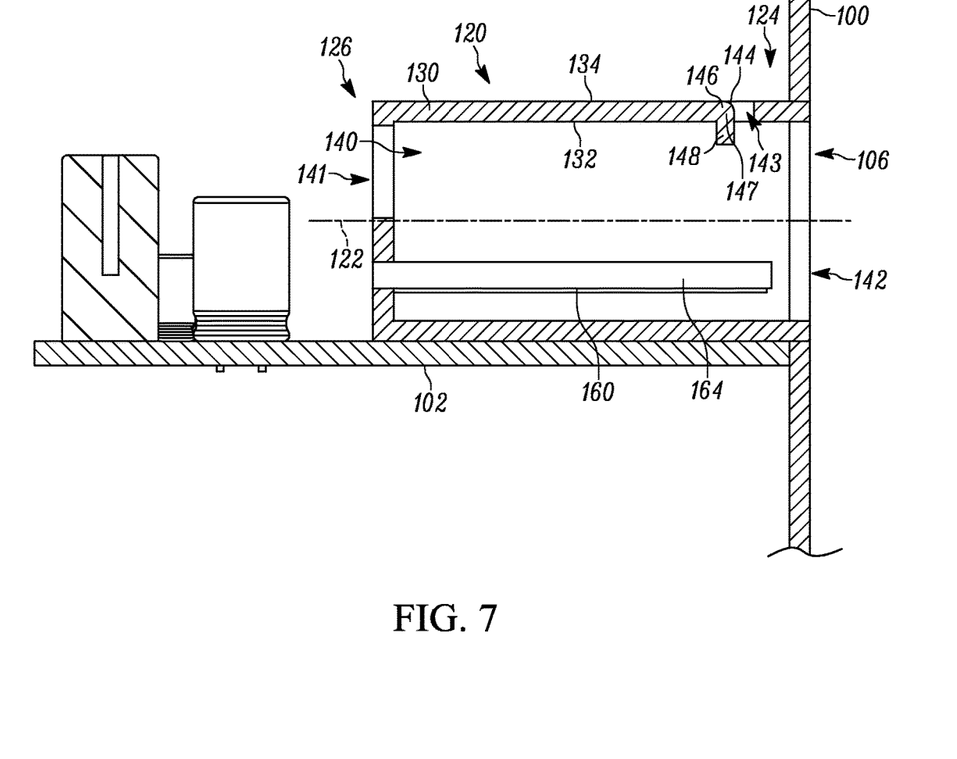
FIG. 7 is a section view taken along line 7-7 of FIG. 6.

FIGS. 5-7 illustrate an example USB port 120 in which the locking member 20 can be installed to prevent access thereto. The USB port 120 constitutes a conventional data and electrical computer connection secured to a printed circuit board (PCB) 102 within the computer housing 100. More specifically, the USB port 120 constitutes a serial bus having four or more shielded contacts for transmitting power and differential data signals between computing devices. Examples of USB ports for use with the locking member 20 include Type A, Type B, Mini-A, Mini-B, Micro-A, and Micro-B. It will be understood that the locking member 20 is sized and shaped similar to the intended USB port 120 configuration.

The USB port 120 has a generally rectangular shape and extends along a centerline 122 from a first end 124 to a second end 126. The USB port 120 includes a sidewall or shield 130 having an inner surface 132 and an outer surface 134. The inner and outer surfaces 132, 134 are concentric with one another. The sidewall 130 is rectangular but can alternatively be square or have another polygonal shapes. In some examples, the sidewalls 30, 130 of the locking member 20 and USB port 120 may have substantially concentric shapes that are closely sized to one another. The inner surface 132 defines an interior space 140 for receiving a mating USB connector (not shown) at the front of the computer housing 100. To this end, an opening 142 extends through the first end 124 into the interior space 140. An opening 141 extends through the second end 126 into the interior space 140. The sidewall 130 is formed from a rigid material, such as metal or plastic.

As shown, the USB port 120 includes five contacts 160 embedded within a plastic insert 164 secured to the second end 126. The sidewall 130 surrounds the contacts 160 and insert 164 and is electrically isolated therefrom. The sidewall 130 is secured to the PCB 102 such that the first end 124 of the USB port 120 is flush with an opening 106 in the front of the computer housing 100 when the PCB is installed therein. In this construction, only the first end 124 of the USB port 120 is visible or accessible from outside the computer housing 100 during normal operation of the computer.

One or more openings 142 extend through the sidewall 130 at the first end 124 of the USB port 120 from the outer surface 134 to the inner surface 132 to define one or more tabs 144 for releasably retaining the mating USB connector (not shown). As shown, a pair of openings 142 on either side of the centerline 122 defines a pair of tabs 144. The openings 142 are trapezoidal to define a pair of trapezoidal tabs 52, although the openings can have alternative shapes, e.g., square, triangular or circular, to define alternatively shaped tabs. Each tab 144 has an end 146 connected to the sidewall 130 and a free end 148 extending through the opening 142 into the interior space 140. The ends 146, 148 extend at an angle, e.g., perpendicular, to one another about a joint 147 connecting the ends. Due to the rigid construction, the tabs 144 are not configured or intended to be resiliently deflectable.

Figure 8A:
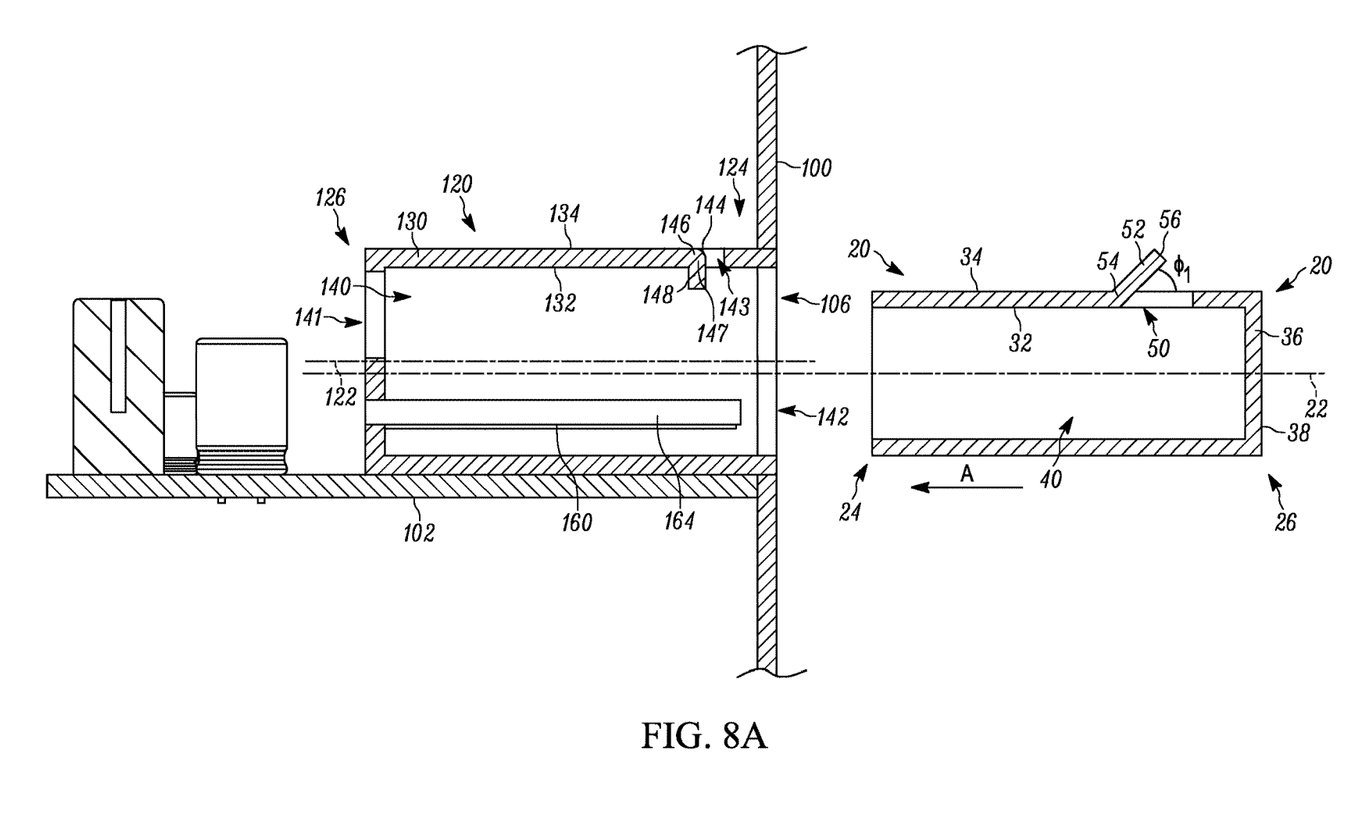
FIGS. 8A-8C are schematic illustrations of the locking member of FIG. 1 during and following installation into the USB port.
Figure 8B:
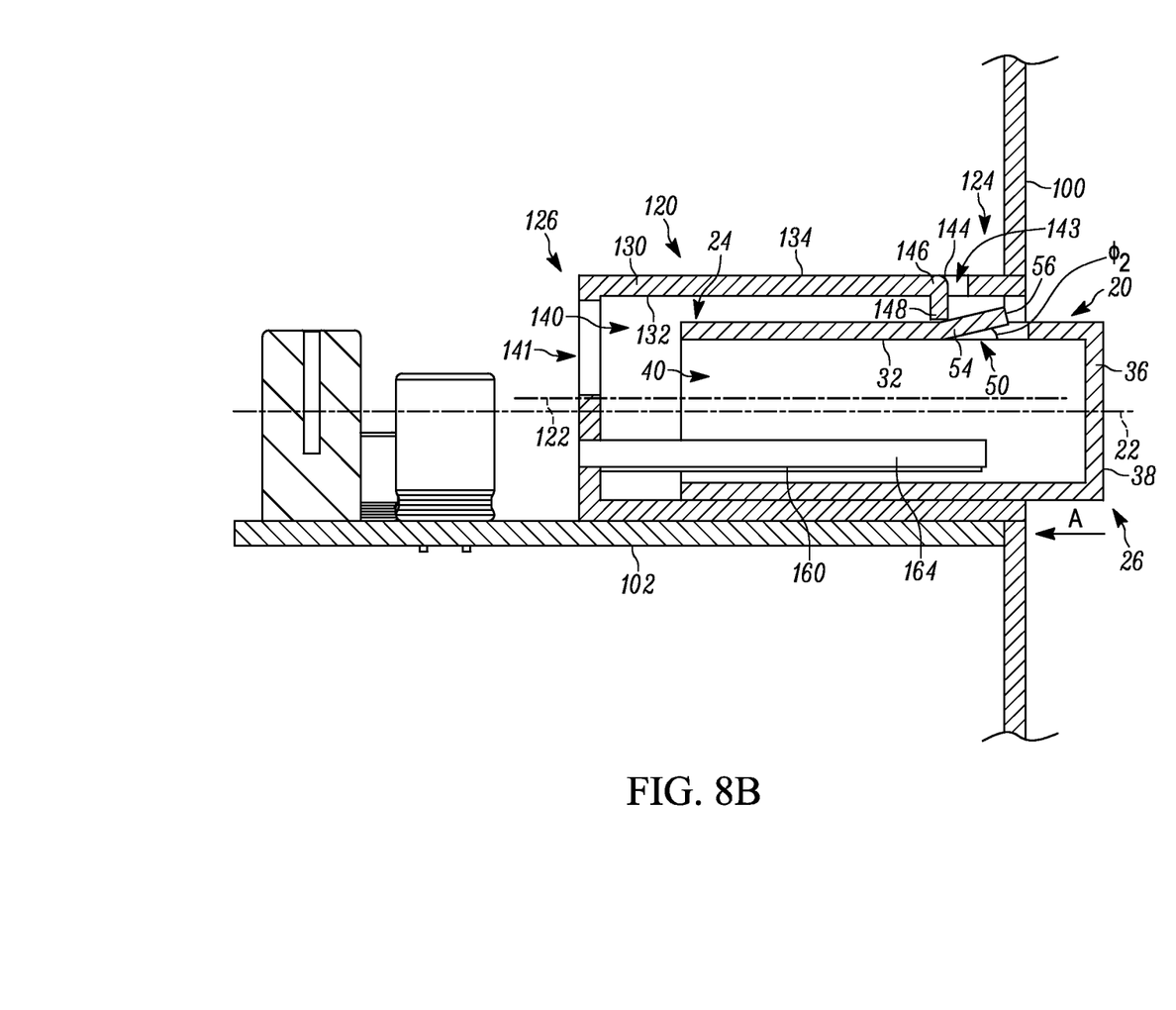
Figure 8C:
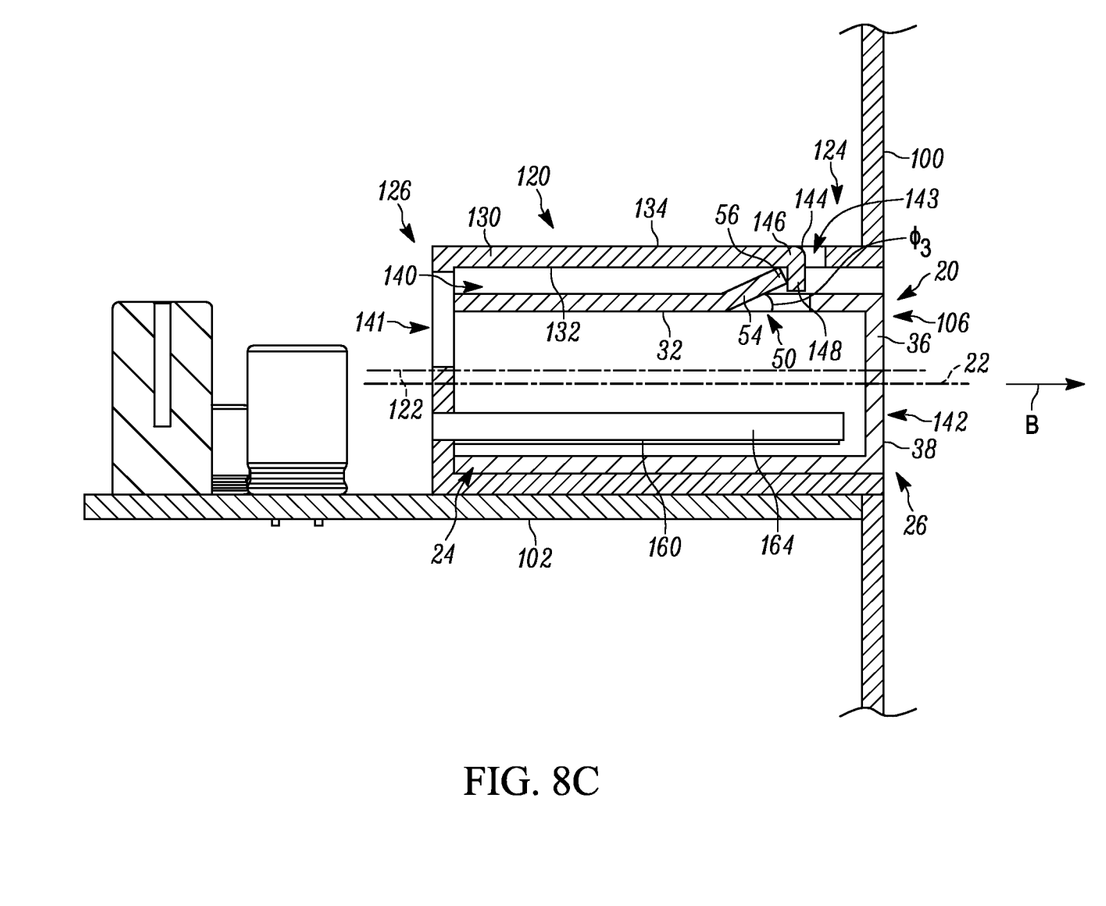

Referring to FIGS. 8A-8C, when it is desirable to prevent access to the USB port 120, e.g., for security reasons, the locking member 20 is secured to the USB port. The centerline 22 of the locking member 20 is aligned generally with the centerline 122 of the USB port 120 with the tabs 52 positioned on the same side of the locking member as the tabs 144 on the USB port. In this configuration, the first ends 24, 124 of the locking member 20 and USB port 120 face each other. The locking member 20 is then inserted through the opening 142 into the interior space 140 of the USB port 120 in a direction A such that the insert 164 and contacts 160 extend into the interior space 40 of the locking member 20. As the locking member 20 is advanced further into the USB port 120, the tabs 52, 144 engage one another. More specifically, the free ends 56 of the resilient tabs 52 on the locking member 20 are engaged and deflected inwards, towards the interior space 40, by the more rigid ends 148 of the tabs 144 on the USB port 120 until the tabs 52 extend at an angle $\Phi_2$ less than the angle $\Phi_1$. This deflection of the tabs 52 to a first deflected condition during installation of the locking member 20 facilitates insertion of the locking member in the direction A into the USB port 120.

Because the tabs 144 are positioned at the first end 124 of the USB port 120, once the locking member 20 is inserted a predetermined amount in the direction A the tabs 52 pass axially beyond the tabs 144 to space the free ends 56 from the tabs 144. Owing to the spring bias of the tabs 52, the tabs 52 automatically deflect upwards away from the interior space 40 until the tabs 52 extend at an angle $\Phi_3$. The angle $\Phi_3$ is greater than the angle $\Phi_2$ and can be less than the angle $\Phi_1$ or equal to the angle $\Phi_1$. In other words, the tabs 52 can return to the initial, unstressed condition or be placed in a second deflected condition when installed different from the first deflected condition. In either case, the tabs 52 deflect sufficiently to place the free ends 56 of the tabs 52 in a position behind the second ends 148 of the tabs 144 on the USB port 120, which locks the locking member 20 within the USB port to prevent access thereto. The sidewalls 30, 130 form a tight fit with one another such that the locking member 20 fits snugly within the USB port 120.

Due to the position and angle $\Phi_3$ of the tabs 52 behind the tabs 144, moving the locked locking member 20 in a direction B opposite the direction A does not cause or allow the tabs 52 to deflect inwards. Rather, attempting to move the locking member 52 in the direction B would cause the free ends 56 of the tabs 52 to abut the tabs 144 and rotate further outwards, preventing further movement of the locking member 20 in the direction B.

The tabs 52, 144 can be axially positioned on their respective component 20, 120 such that the outer surface 38 of the wall 36 is not flush with the opening 106 in the computer housing 100 until the tabs 44 deflect back to the unstressed condition behind the tabs 144. Such a construction prevents any portion of the locking member 20 from extending out of the opening 106 while the locking member is installed in the USB port 120, thereby preventing the user from grasping or pulling the locked locking member in the direction B. The lengths of the components 20, 120 can be configured such that the first end 24 of the locking member 20 abuts the second end 126 of the USB port 120 when the outer surface 38 is flush with the opening 106 in the computer housing 100. Therefore, the installed locking member 20 is not removable from the USB port 120 simply by pulling on the locking member in the direction B opposite the direction A.

Furthermore, due to the solid end wall 36, no tool or key can access the interior space 40 or openings 50 of the locking member 20 through the opening 106 in the computer housing 100 to manually deflect the tabs 52 inward. Moreover, the limited space between the inner surface 132 of the USB port 120 and the outer surface 34 of the locking member 20, coupled with the angle $\Phi_3$ of the tabs 52, makes accessing and manipulating the tabs 52 through the opening 106 (e.g., in an attempt to enable removal of the locking member 20 from the USB port 120) unfeasible and impractical. Consequently, the tabs 52 cannot reasonably be accessed through the front of the computer housing 100 to be deflected back to the stressed condition inward of the tabs 144 to allow the installed locking member 20 to be removed from the USB port 120 in the direction B. In fact, the tabs 52 can only be adequately manually deflected by accessing the ends 24, 126 of the components 20, 120, which is accomplished by removing or opening the computer housing 100 to expose the entire USB port. This degree of access allows the user to readily insert the tool or key through the opening 141 of the second end 126 of the USB port 120 adjacent the open first end 24 of the inserted locking member 20. With accessed acquired, the tool or key can be used to deflect the tabs 52 inward to the stressed condition and allow the locking member 20 to be removed from the USB port 120 in the direction B.

The locking member 20 is advantageous in that it prevents ready access to the USB port 120. In other words, the USB port 120 cannot simply be breached by pulling the installed locking member 20 out of the USB port 120 or inserting a tool through the front of the computer housing 100 to deflect the tabs 52 to a position allowing for the removal of the locking member. Rather, one wishing to breach the USB port 120 must take the added time to open or remove the computer housing 100 to access the interior space 140 in which the unstressed tabs 52 reside. Such an additional step is clearly more cumbersome and likely to draw attention to a would-be-thief than simply removing the locking member 20 from the USB port 120 without disturbing the computer housing 100.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A security device comprising:
a locking member to be installed within a port for a data sending/receiving component of a computer to prevent use of the port, wherein the port is a universal serial bus (USB) port,
wherein the locking member comprises:
a sidewall defining an interior space to extend within a housing of the computer; and
a plurality of tabs extending from the sidewall towards an end of the locking member and being deflectable relative to the sidewall, wherein the plurality of tabs deflect in a manner sufficient to place free ends of the plurality of tabs in a position behind a plurality of tabs on the USB port to prevent access to the USB port,
the locking member having a deflected condition in which the tabs extend at a first angle relative to the sidewall to allow for movement of the locking member into the data sending/receiving component in a first direction, and an installed condition in which the tabs extend at a second angle greater than the first angle to prevent removal of the locking member from the data sending/receiving component,
the locking member being incapable of returning to the deflected condition once in the installed condition by accessing the end of the locking member from outside of the housing of the computer.

2. The security device of claim 1, wherein the application of force to the locking member in a second direction opposite the first direction while the locking member is in the installed condition is insufficient to return the locking member to the deflected position.

3. The security device of claim 1, wherein the plurality of tabs comprises a pair of tabs positioned on opposite sides of a centerline of the locking member.

4. The security device of claim 1, wherein the plurality of tabs experience less stress in the installed condition than in the deflected condition.

5. The security device of claim 1, wherein the locking member is incapable of removal from outside the housing of the computer.

6. The security device of claim 1 further comprising an end wall closing the interior space at the end of the locking member.

7. The security device of claim 6, wherein the end wall is free of openings.

8. The security device of claim 6, wherein the end wall includes an outer surface extending substantially coplanar with the computer housing when the locking member is in the installed condition.

9. The security device of claim 1 further comprising an opening associated with each tab, each tab of the locking member having a first end secured to the sidewall and a second end that is pivotable about the first end into the opening.

10. The security device of claim 9, wherein the tabs of the locking member are trapezoidal.

11. A security device comprising:
a locking member to be installed within a port for a data sending/receiving component of a computer to prevent use of the port, wherein the port is a universal serial bus (USB) port,
wherein the locking member comprises:
an interior space defined by a sidewall that is to extend within a housing of the computer;
a plurality of resilient tabs extending from the sidewall and being deflectable relative to the sidewall, wherein the plurality of resilient tabs deflect in a manner sufficient to place free ends of the plurality of resilient tabs in a position behind a plurality of tabs on the USB port to prevent access to the USB port; and
an end wall closing the interior space at an end of the locking member,
the locking member having a deflected condition in which the tabs extend at a first angle relative to the sidewall to allow for movement of the locking member into the data sending/receiving component in a first direction and an installed condition in which the tabs extend at a second angle greater than the first angle to prevent removal of the locking member from the data sending/receiving component from outside of the housing of the computer,
the locking member being removable from the data sending/receiving component once in the installed condition by accessing a second end of the locking member opposite the first end.

12. The security device of claim 11, wherein the plurality of resilient tabs comprises a pair of tabs positioned on opposite sides of a centerline of the locking member.

13. The security device of claim 11, wherein the end wall includes an outer surface extending substantially coplanar with the computer housing when the locking member is in the installed condition.

14. The security device of claim 11, wherein the end wall is free of openings.

15. The security device of claim 11, wherein the tabs experience less stress in the installed condition than in the deflected condition.

16. The security device of claim 11, wherein the locking member is incapable of being removed from outside the housing of the computer.

* * * * *